United States Patent [19]

Guthrie et al.

[11] Patent Number: 4,559,373
[45] Date of Patent: Dec. 17, 1985

[54] WELDABLE SEALANTS FOR METAL AND METHOD OF USE

[75] Inventors: James L. Guthrie, Ashton; Helen F. Roberts, Sudlersville; Christian B. Lundsager, Ashton, all of Md.

[73] Assignee: W. R. Grace & Co., New York, N.Y.

[21] Appl. No.: 514,667

[22] Filed: Jul. 18, 1983

[51] Int. Cl.$^4$ .......................... C08K 3/08; C08L 61/00
[52] U.S. Cl. .............................. 523/220; 106/193 M; 148/23; 148/24; 523/458; 524/440
[58] Field of Search ................. 148/23, 24; 524/440; 106/193 M; 523/220, 458

[56] References Cited

U.S. PATENT DOCUMENTS

| | | |
|---|---|---|
| 3,360,466 | 12/1967 | Short . |
| 3,620,875 | 11/1971 | Guglielmo et al. . |
| 3,620,876 | 11/1971 | Guglielmo et al. . |
| 3,731,868 | 5/1973 | Arikawa et al. ...................... 148/23 |
| 3,954,482 | 5/1976 | Novack .......................... 106/193 M |
| 4,057,706 | 11/1977 | Tanigaki et al. ...................... 148/24 |
| 4,268,430 | 5/1981 | Suzuki et al. ........................ 524/440 |
| 4,431,465 | 2/1984 | Mizuhara et al. ..................... 148/24 |

FOREIGN PATENT DOCUMENTS

| | | |
|---|---|---|
| 0000270 | 1/1979 | European Pat. Off. . |
| 0010132 | 4/1980 | European Pat. Off. . |
| 339143 | 10/1968 | Japan . |
| 44-11280 | 5/1969 | Japan . |
| 844470 | 8/1960 | United Kingdom . |
| 850215 | 10/1960 | United Kingdom . |
| 1135803 | 12/1965 | United Kingdom . |
| 1416203 | 12/1975 | United Kingdom . |
| 1499820 | 2/1978 | United Kingdom . |
| 1548226 | 7/1979 | United Kingdom . |
| 2109384 | 6/1983 | United Kingdom . |

OTHER PUBLICATIONS

Weymueller, C. R., "How to Resistance Weld the Coated Steels", Welding Design & Fabrication, (Oct. 1978), pp. 82–85.

"Recent Technical Development: Spot Weld Through Adhesive", Iron Age Metalworking International, (Apr. 1970), pp. 32–32.

Jones, T. B. "A Future for Weldbonding Sheet Steel", Welding and Metal Fabrication, (Jul./Aug. 1978), pp. 415–520.

Primary Examiner—Allan M. Lieberman
Attorney, Agent, or Firm—Edward J. Cabic

[57] ABSTRACT

A weldable sealant composition is made by adding ferrous metal particles to a sealant having a viscosity of at least 6 million centipoises. The sealant composition is placed between two metal plates and permits resistance welding, i.e. spot welding, to take place.

8 Claims, No Drawings

WELDABLE SEALANTS FOR METAL AND METHOD OF USE

BACKGROUND OF THE INVENTION

This invention relates to a weldable heat-curable sealant composition and its method of use to weld two pieces of metal together.

Certain adhesive and sealant applications such as those in the fabrication and assembly of automobiles require metal parts such as steel separated by a sealant to be welded together. The chemical compositions of the sealants are such that they harden or cure in place when the welded assembly is passed through the paint oven near the end of the manufacturing process. However, a useful thermosetting sealant must have enough cohesive strength in its uncured state to prevent it from sagging out of place or from being washed off by cleaning sprays.

Sealants which allow subsequent resistance welding are said to be weldable or to have weld-through capability. Weldable sealants are typically soft so that they can deform and allow the metal parts to touch during attempted welding. However, soft sealants have the disadvantage that they may fail other specifications such as strength, sag resistance, or resistance to cleaning sprays that are common to the industry. Therefore, it is desirable for weldable sealants to have as much viscosity, cohesive strength, tack and body as is required to meet such specifications. It is difficult to formulate a sealant which is both soft enough to be weldable and strong enough in its uncured state. In our experience, most sealants with viscosities below about 5 million centipoises at 25° C. are weldable, but too weak, whereas most sealants with viscosities above about 5 million centipoises cannot be welded. Also, many sealants which are soft at the initial application temperature of 80° C. to 100° C. become so stiff after standing for a few hours at ambient temperature that they do not permit the two pieces of metal to come close enough together to form a good weld. A sealant may not be considered truly weldable unless it allows a good weld to be made after standing in place at ambient temperature for four days (96 hours).

OBJECTS OF THE INVENTION

It is an object of this invention to provide a heat-curable sealing composition which can be applied at a temperature of 80° to 100° C. and which has adequate strength in its uncured state and yet which permits welding through the sealant when placed between two pieces of metal such as steel.

It is a further object of this invention to provide weldable sealant compositions that contain ferrous metal powders.

It is a further object of this invention to provide hot melt sealant compositions containing solid or liquid epoxy resins.

It is a further object of this invention to convert certain strong but unweldable sealant compositions into weldable compositions by the addition of ferrous metal powders which are preferably coarser than about 325 mesh.

It is a further object of this invention to weld together two pieces of metal such as steel by first adhering the pieces together in a spaced apart relationship with a hot melt sealant composition. This sealant is strong, but weldable before curing so as to permit the two pieces of metal to be welded together. The sealant can then be further cured or hardened permanently in place after welding to provide a permanent seal by being heated such as in a paint oven.

These and further objects will become apparent as the description of the invention proceeds.

SUMMARY OF THE INVENTION

A weldable sealant composition has been obtained in which ferrous metal particles are added to a thermosetting composition which has a viscosity at 25° C., before curing, of at least 6 million centipoises. By ferrous metal we mean the metals of Group VIII of the Periodic Table which are iron, cobalt, nickel or mixtures of these metals. The preferred metal particle is iron because of its low cost although more expensive ferrous metal powders such as iron containing steel or stainless steel or nickel can also be used. A preferred sealant is the reaction product of an epoxy resin containing more than one hydroxyl group, one or more diols and a polyisocyanate and filled with inorganic fillers. The sealant preferably has a viscosity of at least 6 million centipoises so that it remains in place and retains its shape before welding.

The method of welding two pieces of metal together such as steel involves placing the sealant composition of this invention between the two pieces of metal to form an assembly with the two pieces spaced apart about 30 mils (760 microns) by the sealant. The assembly is inserted between the two electrodes of a resistance welder, i.e. a spot welder. When the welder is turned on, it goes through an initial squeeze cycle, where the two plates are forced together, then through a weld cycle where the current flows through the assembly and then finally through a hold and off cycle before the welded assembly is removed from the machine.

DESCRIPTION OF THE SPECIFIC EMBODIMENTS

The present invention provides a method for converting certain strong but unweldable sealant compositions into weldable compositions by the addition of an electrically conductive ferrous metal powder such as iron powder so that when the assembly of steel parts and sealant are compressed between the welding electrodes, the metal particles will be squeezed together to form a conductive path. When the electric current begins to flow, sufficient heat will be generated to soften the sealant enough to allow a good weld.

Low melting metals such as zinc (419° C.), aluminum (660° C.), copper (1083° C.) and silver (961° C.) are undesirable as conductors in this application because they may melt when the current begins to flow, and such melting could interrupt the current flow before any of the steel begins to melt in the attempted welding process. These low-melting metals are also undesirable because they tend to have thick and strong oxide coatings which may prevent electrical current from passing easily under welding conditions.

The ferrous metals are preferred as conductors because they have higher melting points which are nearer the melting point of the steel pieces which are to be welded. Iron has a m.p. of 1530° C.; nickel has a m.p. of 1455° C. and cobalt has a m.p. of 1493° C. The ferrous metals which are preferred according to the present invention also tend to have thin and fragile oxide coatings which do not interfere with the passage of electrical current.

The sealants which can be made weldable by the process of this invention include any gap-filling substance which is too stiff to allow welding under the usual spot-welding conditions. More preferred are the thermosetting sealants such as those for use by the automobile industry that are designed to adhere to oily steel and to cure or become hardened in the paint oven. These can be of the epoxy, polysulfide, polyurethane, silicone, acrylic, or drying oil types. The preferred compositions for use with this invention are the epoxy-pendant, urethane-containing compounds which are reaction products of epoxy resins containing more than one hydroxyl group and one or more diols and a polyisocyanate as set forth in U.S. patent application Ser. No. 444,987, filed Nov. 29, 1982, the subject matter of which is incorporated herein by reference.

One preferred group of sealants have viscosities of from about 10 to 30 million centipoises. For these sealants, the preferred iron powder conductor can be used in an amount of from about 1 to 10% by weight of the sealant composition with an especially preferred amount of about 5% by weight of the sealant composition. The requirement when using lower amounts of ferrous metals, however, is that there must at least be enough present so that the welding will take place. The preferred sealants having a viscosity of at least 6 million centipoises will not weld in the absence of any ferrous powder. As to the upper end of the range, larger amounts of ferrous metal can be used. However, this additional powder may adversely effect the rheology and strength of the sealant. Also, when these highly loaded sealants are cured in the oven the large amount of metals may cause the sealant to crack.

When sealants are selected with high viscosity values of 30–50 million centipoises, the amount of the ferrous metal such as iron may have to be increased to as much as 40% to allow welding. It is more preferable to have a sealant viscosity between about 10 million and 30 million centipoises so that less iron powder may be used.

The preferred particle size of the iron powder is between 100 mesh and 325 mesh. If all of the powder is finer than 325 mesh then it may be too fine to be effective for welding and it may adversely increase the viscosity of the sealant. If the powder is coarser than 100 mesh, the current conducted through such a large particle before the metal pieces are able to touch can cause the metal particle to explode or to overheat and to burn the sealant.

Some commercial iron powders contain about 40% of the iron particles finer than 325 mesh. These products can also be used according to the present invention provided that the remainder is between the desirable range of 100 to 325 mesh.

Iron powders are generally produced by one of four methods: the reduction of oxides to give irregular spongy particles; the dissociation of iron carbonyls to form uniform spherical but very fine particles; the electrolytic deposition from salts or solutions to form dendritic particles; or the atomization or breaking up of a stream of molten metal to form round irregular spheroids. The spongy, atomized, or coarse electrolyte types are preferred in the practice of this invention.

The spot welding machine used in the following examples was a Lors Machinery, Inc. stationary welder, Model 130-AP. The welding tips were of the truncated cone type with quarter inch diameter surfaces. The assembly of the two steel plates with the sealant in between was inserted between the two electrodes and the machine was turned on. The welding cycle was:

|  | Cycles |
| --- | --- |
| Squeeze | 58 |
| Weld | 5 |
| Hold | 8.5 |
| Off | 8 | where one cycle is 1/60 second. During the squeeze cycle the pressure was set at 525 pounds of electrode force. The voltage is 5 volts and if a weld occurs, the current flow is typically 9,000–12,000 amps.

The invention is thought to work by the following sequence of events although the exact internal mechanism is not known. When the viscosity of a sealant across the 30 mil (760 micron) gap is less than about 5 million centipoises and the two pieces of metal are squeezed together during the squeeze cycle of the welding machine, which is typically about one second or less, the metal pieces have a good chance of touching. But when the viscosity is higher, there is not time enough during the squeeze cycle to allow the metal pieces to touch although a weld may form if squeezing is continued for several seconds. If a ferrous metal powder of a desirable particle size distribution is present, the squeezing action can pack the conductive particles together so that an electrically conductive pathway can form before the metal pieces are actually in contact. For particles in the size range of 100 mesh and 325 mesh the particle sizes are from about 44 to 150 microns. It is possible, in fact, that the conductive pathway may be only the thickness of a single particle, even though the metal pieces have not yet come close enough to be in contact, and the required amount of squeezing time is therefore reduced. This would be the case when the original 760 microns gap was squeezed down to about 150 microns or less in size. However, it is more likely that several particles may pack together initially to form the conductive path. Once the current begins to flow, heat is generated which causes the sealant composition to soften further so that the metal pieces can come into complete contact, assuring a weld of high quality.

Having described the basic aspects of our invention, the following examples are given to illustrate specific embodiments thereof.

TRADE NAMES USED IN THE EXAMPLES

Cab-O-Sil—A fumed silica product available commercially from the Cabot Corporation.
Celogen AZ—Azodicarbonamide available commercially from Uniroyal.
EPON 1000-F—An epoxy resin of approximately 1000 molecular weight derived from epichlorohydrin and bisphenol-A and commercially available from Shell Chemical Company.
Epoxy DER 732—A liquid epoxy resin derived from polypropylene glycol and epichlorohydrin and commercially available from Dow.
Formrez 55-112—A 1000 molecular weight polyester diol derived from adipic acid and neopentyl glycol and commercially available from Witco Chemical Company.
Isonate 125-M—Methylenediphenyl isocyanate (MDI) available commercially from the Upjohn Company.

Isonate 143-L—A liquid isocyanate product having one equivalent of isocyanate content per 143 grams, available commercially from the Upjohn Company.

Isonate 181—A liquid diisocyanate product having one equivalent of isocyanate content per 181 grams available commercially from the Upjohn Company.

Isonate 240—A liquid diisocyanate product having one equivalent of isocycante content per 240 grams, available commercially from the Upjohn Company.

Teracol 1000—A 1000 molecular weight polyether glycol available commercially from Dupont.

Teracol 2000—A 2000 molecular weight polyether glycol available commercially from Dupont.

EXAMPLE 1

A mixture of 120 g of EPON 1001-F, 120 g of Teracol 1000, and 60 g of Formrez 55-112 was dewatered by heating and stirring at 70° C. for two hours in a 500 ml resin kettle under a reduced pressure of about 2 torr.

To this mixture was added 31.3 g of Isonate 125-M and 9 g of pulverized dicyandiamide (Omicron) and stirring was continued for half an hour while the temperature was maintained between 70° and 90° C. Then, 100 g of calcium carbonate was stirred into the mixture to act as a filler. The resulting sealant, after cooling to room temperature, was very tacky and had the consistency of a stiff putty. Its viscosity at 25° C. was about 7 million centipoises when measured on a Contraves Rheomat Model 115.

To conduct the welding test, a portion of the sealant was heated for one hour at 100° C. and then applied to a 1½ inch by 5 inch piece of 30 mil thick cold-rolled steel so that an area of 1½ inch by 1½ inch square was covered by a thickness of 30 mils of sealant. Then, another identical piece of steel was laid on top of the first so that the two pieces of steel were stuck together by the warm sealant. The assembly was allowed to stand at room temperature for 96 hours before welding, during which time the sealant became very stiff. Then a single attempt was made to weld the two pieces together in the center of the 1½ inch square regions which were separated by 30 mils of the adhesive, using ¼-inch diameter welding electrodes and a test welding procedure of 58 cycles (58/60 seconds) of squeeze time, 5 cycles of attempted current flow with a voltage of 5 volts, and 8.5 cycles of hold time to allow cooling after the attempted passage of current. No welding occurred.

EXAMPLE 2

The unweldable product of Example 1 was made weldable by the addition of iron powder. 20 grams of the product of Example 1 was softened by heating for a few minutes at 80° C. Then, one gram of an iron powder of a sponge type and having approximately 60% of the particles between 150 and 350 mesh and the remainder finer than 325 mesh was stirred into the sealant composition. When the welding test was repeated, the two pieces of steel were welded together easily. When they were pulled apart, the welded spot failed by plug failure and was considered to be an excellent weld.

EXAMPLE 3

Example 1 was repeated except that the Isonate 125-M was replaced by 45.3 g of Isonate 181. The sealant, which contained no iron, did not allow welding under the conditions of the test.

EXAMPLE 4

Example 3 was repeated except that 1 g of iron powder was incorporated as described according to the procedure of Example 2. The sealant allowed an excellent weld to be formed.

EXAMPLES 5–8

Example 4 was repeated except that the amount of iron powder by weight of the total sealant was as follows:

| Example | Iron Content |
|---------|--------------|
| 5       | 12%          |
| 6       | 19%          |
| 7       | 26%          |
| 8       | 33%          |

The sealant allowed an excellent weld to be formed in each case. formed.

EXAMPLE 9

Example 3 was repeated except that the amount of Isonate 181 was increased to 51.7 g, causing the viscosity of the sealant at 25° C. to be about 30 million centipoises. The sealant did not allow welding.

EXAMPLE 10

Example 9 was repeated except that 1 g of iron powder was added to 20 g of the sealant composition according to the procedure of Example 2. The sealant allowed an excellent weld to be formed.

EXAMPLE 11

Example 1 was repeated except that the Isonate 125-M was replaced by 60 g of Isonate 240. The sealant did not allow welding.

EXAMPLE 12

Example 11 was repeated except that 1 g of iron powder was incorporated in 20 g of sealant composition. The sealant allowed an excellent weld to be formed.

EXAMPLE 13

Example 1 was repeated except that the Isonate 125-M was replaced by 35.8 of Isonate 143-L. The sealant did not allow welding. The viscosity of the product at 25° C. was approximately 9 million centipoises.

EXAMPLE 14

Example 13 was repeated except that 1 g of iron powder was incorporated in 20 g of sealant composition. The sealant allowed an excellent weld to be formed.

EXAMPLE 15

Example 14 was repeated except that the iron powder was replaced by a stainless steel powder of a prealloyed atomized type with particle size between 100 and 325 mesh. The resulting sealant allowed an excellent weld to be formed.

EXAMPLE 16

Example 14 was repeated except that the iron powder was replaced by a reduced nickel powder with 60% of the particles (by weight) between 100 and 325 mesh and the rest finer than 325 mesh. The nickel powder allowed an excellent weld to be formed.

EXAMPLE 17

A metal-free sealant composition was prepared according to the procedure of Example 1 except that the composition was: 20 g of EPON 1001-F, 60 g of Teracol 2000, 20 g of Epoxy DER 732, 9 g of Isonate 125-M, 3 g of dicyandiamide, 20 g of calcium carbonate, 25 g of calcium silicate, 1 g of zinc oxide, 1 g of Celogen AZ, and 2 g of Cab-O-Sil M-5. This sealant did not allow a weld to be formed.

EXAMPLE 18

Example 17 was repeated except that 5 g of an electrolytic iron powder with about 60% between 100 and 325 mesh was incorporated. The iron powder allowed an excellent weld to be formed.

EXAMPLE 19

Example 17 was repeated except that there was 40 g of EPON 1001-F, 14 g of Isonate 125-M, and the Teracol 2000 was replaced by 60 g of Teracol 1000. The resulting sealant did not allow a weld to be formed.

EXAMPLE 20

Example 19 was repeated except that 2 g of an electrolytic iron powder with 60% between 100 and 325 mesh was used, causing the sealant to contain only 1.2% by weight of iron. The sealant allowed an excellent weld to be formed.

It is understood that the foregoing detailed description is given merely by way of illustration and that many variations may be made therein without departing from the spirit of this invention.

What is claimed is:

1. A weldable sealant composition suitable for use as a sealant for the purpose of filling space between two pieces of steel to be welded comprising an admixture of
   a malleable sealant having a visosity of from between 6 million to 50 million centipoises at 25° C., said sealant being present in an amount of 60-99% by weight of said admixture, and
   a weldably effective amount of ferrous metal particles dispersed in said sealant, said particles being present in an amount of from about 1 to 40% by weight and having a particle size smaller than 100 mesh,
   said sealant composition being capable upon being heated to a temperature of at least 80° C. of softening to form a bead which adheres to the steel surface to be sealed and said adhered sealant composition upon returning to ambient conditions being capable of flowing when squeezed by a stationary welding machine to allow said steel pieces to approach each other sufficiently to be welded.
2. A composition according to claim 1, wherein said ferrous metal particles are selected from the group consisting of iron, steel, stainless steel, nickel, cobalt, and mixtures thereof.
3. A composition according to claim 2, wherein said ferrous metal particle is iron.
4. A composition according to claim 1, wherein said ferrous metal particles have a particle size ranging from about 100 mesh to about 325 mesh.
5. A composition according to claim 4, wherein there are additional ferrous metal particles having particles smaller than 325 mesh.
6. A composition according to claim 3, wherein said ferrous metal particles are present in an amount of from about 1 to 10% by weight.
7. A composition according to claim 1, wherein said sealant is an epoxy-pendant, urethane-containing compound which is the reaction product of an epoxy resin containing more than one hydroxyl group, one or more diols and a polyisocyanate.
8. A composition according to claim 1, wherein said sealant has a viscosity of from about 10 to 30 million centipoises.

* * * * *